United States Patent [19]

Hauk et al.

[11] 4,244,208
[45] Jan. 13, 1981

[54] HIGH-PRESSURE LEAK TESTING APPARATUS AND PACKER

[75] Inventors: Ernest D. Hauk, Yucca Valley; Jesse C. Kirkpatrick, Mission Viejo, both of Calif.

[73] Assignee: Service Equipment Design Co., Inc., Signal Hill, Calif.

[21] Appl. No.: 41,611

[22] Filed: May 23, 1979

[51] Int. Cl.³ ............................................. G01M 3/28
[52] U.S. Cl. ....................................... 73/46; 73/49.1
[58] Field of Search ................ 73/46, 49.1, 49.5, 49.8; 277/34.6; 285/18

[56] References Cited

U.S. PATENT DOCUMENTS

| 3,371,521 | 3/1968 | Hauk ........................................ 73/46 |
| 3,975,945 | 8/1976 | Hauk et al. .............................. 73/46 |
| 4,099,405 | 7/1978 | Hauk et al. .............................. 73/46 |
| 4,185,492 | 1/1980 | Hauk et al. .............................. 73/46 |

FOREIGN PATENT DOCUMENTS 2640221  4/1977  Fed. Rep. of Germany ............ 73/49.8

Primary Examiner—James J. Gill
Assistant Examiner—Joseph W. Roskos
Attorney, Agent, or Firm—Gausewitz, Carr, Rothenberg & Edwards

[57] ABSTRACT

In accordance with one aspect of the present disclosure, the locking apparatus for maintaining in closed condition the two halves of the casing sections of a high pressure leak-testing apparatus for pipe joints comprises a plurality of bifurcated links. The locking apparatus further comprises a substantial number of hooks having end portions pivotally connected to the bifurcated links, the connections being at relatively thin hook portions which nest with the links. With the described construction by which a bifurcated or yoke-shaped end of one element is nested relative to a relatively thin portion of another element, it is possible to achieve extremely strong locking of the casing sections in closed condition despite the great pressure contained within the tester.

In accordance with another aspect of the disclosure, the packer of the leak-testing apparatus comprises a hollow cylindrical mass of rubber which is split, and has insert elements molded therein. There are split extrusion-prevention elements at each end of the cylinder and adapted to seat next to the pipe being tested. The extrusion-prevention elements are formed of synthetic resin adapted to flex, the resin having a resistance to extrusion much greater than that of the rubber forming the cylinder.

13 Claims, 9 Drawing Figures

HIGH-PRESSURE LEAK TESTING APPARATUS AND PACKER

BACKGROUND OF THE INVENTION

Reference is made to prior-art U.S. Pat. No. 3,371,521 for Leak-Testing Apparatus for Either Flush or Shouldered Pipe Joints and Packer Therefor. Reference is also made to U.S. Pat. Nos. 3,975,945 and 4,099,405, the former being entitled Apparatus for Testing Pipes for Leaks and the latter being entitled Apparatus and Method for Testing Pipe for Leaks, and Seals Therefor.

U.S. Pat. No. 3,371,521 relies on hooks 17 to maintain the casing closed despite the high fluid pressures contained therein. Such U.S. Pat. No. 3,371,521 also relies on a large packer 21 for sealing purposes.

U.S. Pat. No. 3,975,945 shows an apparatus adapted to contain higher pressures than that of U.S. Pat. No. 3,371,521, but which uses a vertically movable lock pin 20 to lock the casing in closed condition.

U.S. Pat. No. 4,099,405 claims seals which are not a continuous large packer, but instead in the nature of individual strips (reference being made, for example, to FIG. 7).

The present apparatus also employs hooks, not a vertically movable pin, for locking purposes, but has a surprising construction whereby more hooks may be employed for an apparatus of a given size to thus drastically increase the strength of the apparatus without requiring a vertically movable lock pin. The present apparatus also incorporates a packer, but one which will contain much greater fluid pressures than will the packer of U.S. Pat. No. 3,371,521.

DETAILED DESCRIPTION OF THE PREFERRED EMBODIMENT

Figure 1:
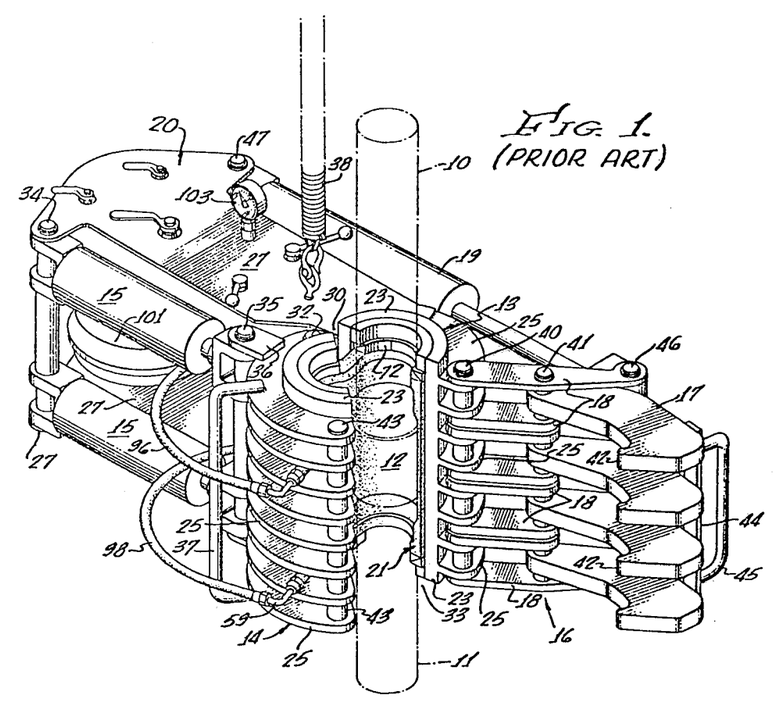
FIG. 1 is the same as FIG. 1 of said U.S. Pat. No. 3,371,521 except that it is labeled "Prior Art"

Except as specifically stated in the present specification and shown in the drawings, the present apparatus is the same as that of the above-cited U.S. Pat. No. 3,371,521. The entire specification and drawings of said U.S. Pat. No. 3,371,521 are hereby incorporated by reference herein, as though set forth in full. The drawings of the present apparatus have been given the same numbers as are shown in FIG. 1 of said U.S. Pat. No. 3,371,521 (which is the same as FIG. 1 of the present application), except relative to changed or added components, such changed or added components being given new numbers.

Figure 2:
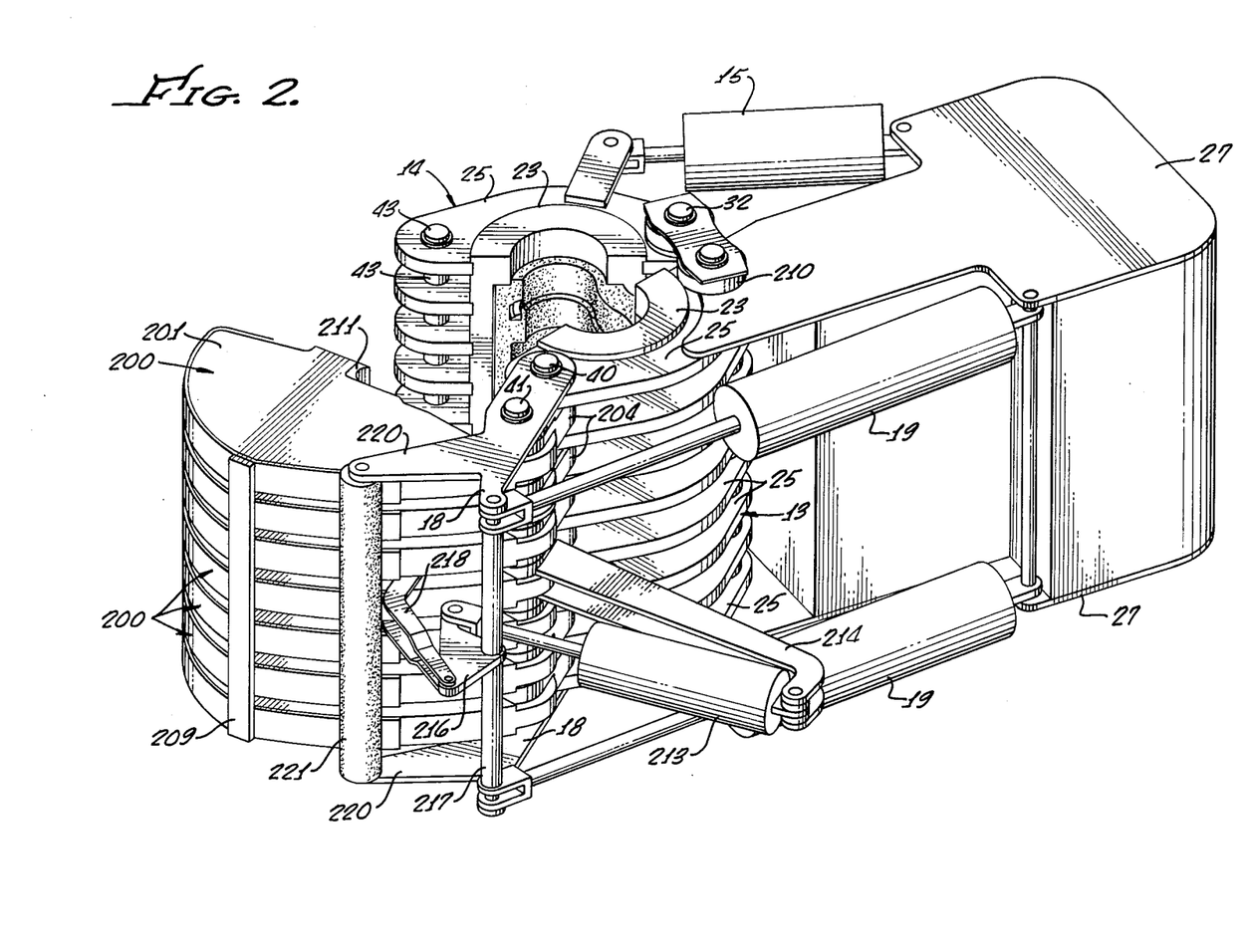
FIG. 2 is a perspective view illustrating the apparatus of the present invention in open condition.

Each jaw 13, 14 of the apparatus is formed of a plurality of ribs 25 which are external of and greatly strengthen semi-cylindrical casing sections or members 23. The ribs 25 are horizontal and are in spaced parallel relationship as illustrated in FIGS. 1 and 2. Because of the space and other limitations imposed by this rib relationship, and by the links or cranks 18 connected to the hooks, it was previously thought that the number of power hooks (such as hooks 17 in FIG. 1) had to be greatly less than the number of ribs 25. It was previously thought, as in the latter two of the above-cited patents, that a vertically movable lock pin was required. In accordance with one major aspect of the present invention, and as best shown in FIGS. 5 and 5a, there is in the present apparatus one large hook 200 for each space between each two adjacent ribs 25.

Each hook 200 has a large body portion 201 which is thick, strong and massive, being only slightly less thick than the dimension of the space between adjacent ribs 25. In addition, each hook 200 has a relatively small and thin bearing portion (ear) 202 which is apertured at 203 for reception of pin 41—such pin 41 extending through top and bottom operating cranks 18 which are actuated by cylinders 19.

Figures 5, 5A, 6, 8:
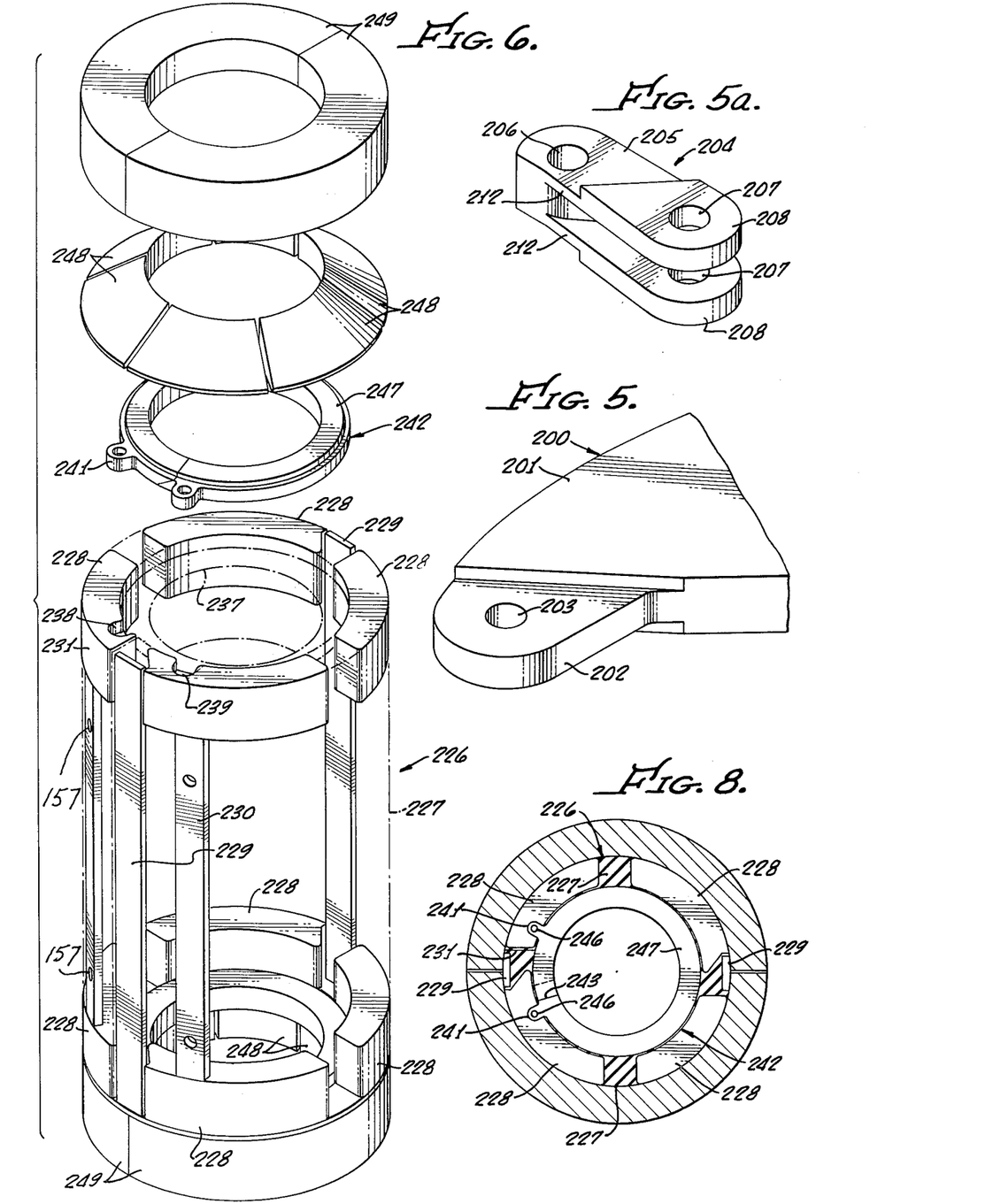
FIG. 5 is an isometric view showing the bearing portion of one of the hooks of the apparatus.
FIG. 5a is an isometric view showing one of the bifurcated links adapted to be associated with the bearing portion 202.
FIG. 6 is an isometric view showing the packer and associated extrusion-prevention appartus, the upper portion of FIG. 6 being exploded and the lower portion being shown assembled.
FIG. 8 is a horizontal sectional view taken on line 8—8 of FIG. 7, the apparatus being shown in closed condition.

In the present apparatus, there are no intermediate cranks or links of the type shown relative to the central three members 18 at the right side of FIG. 1, there instead being the bifurcated links shown at 204 in FIG. 5a. The left or inner portion 205 of each link 204 (FIG. 5) is sized to fit closely but movably between adjacent ones of ribs 25, and is apertured at 206 to receive pin or pintal 40. The right side of each link 204 (FIG. 5a) is thicker than portion 205, and is apertured at 207 (at both its upper and lower spaced portions) to receive the pin 41. Pin 41 extends through aperture 203 in bearing portion 202 of each hook. The upper and lower spaced portions of the right side of each line 204 are numbered 208, and are spaced sufficiently far apart to have movably seated therebetween (in close but movable relationship) the bearing portion 202 of each hook 200.

Each hook 200 and its associated bifurcated link 204 is identical to each other hook and its associated link. The various hooks 200 are secured together as by a bar 209 welded thereto.

Each hook body 201 has a hook portion 211 adapted to hook around the pin 43. As described in the U.S. Pat. No. 3,371,521, when the apparatus is fully closed, the axis of pin 41 is closer to plates 27 (the body of the entire apparatus) than is a plane containing the axes of both pins 40 and 43. This causes the pressure within the sealed chamber to operate to maintain the apparatus closed, regardless of the strengths of the associated cylinders.

Since the hooks 200 lock the casing in closed condition (with pins 40 and 43 held close to each other), it is surprising that this locking action may be effectively maintained despite the presence of the relatively thin bearing portions 202 of the hooks 200. Stated otherwise, applicants have discovered that the very large, thick, body portion 201 of each hook 200 will create enormous strength, maintaining the pins 40, 43 in relatively adjacent locking conditions despite the presence of the relatively thin bearing portion 202 of each hook. There is thus created vast strength in the present apparatus, making possible pressures much greater than those which may be contained by the apparatus shown in "Prior Art" FIG. 1, all without the necessity of using any vertically movable locking pin.

Proceeding now to a further discussion of certain thickness relationships, the thickness of hook body 201 is (as indicated above) only slightly less than the spacing between adjacent ribs 25. Thus, the body 201 at its region relatively near hook portion 211 will fit between the ribs 25 and achieve a maximum strength relationship. The thickness of the left or inner portion 205 (FIG. 5a) of each bifurcated link 204 is (as stated) also only slightly less than the spacing between adjacent ribs 25. Thus, portion 205 will fit snugly but movably between the ribs. The distance between the upper and lower surfaces of the right side of each link 204 (FIG. 5a) is substantially greater than the spacing between adjacent ribs 25, by an amount substantially equal to the thickness of each rib. The spacing between the inner surfaces of elements 208 is somewhat smaller than the distance between the adjacent ribs 25.

The space between the right portions or ears 208 (FIG. 5a) of element 204 is thinner, in comparison to the spacing between ribs 25, by about twice the thickness of each thin region 212 shown at the left of FIG. 5. The space between the ears 208 (right portions 208) is just sufficiently large to receive the relatively thin bearing portion 202 of the hook 200.

The major result of the described relationships is that there is one hook 200 for each space between adjacent ribs 25, which is to be compared to the "Prior Art" condition (right side of FIG. 1).

Figure 3:
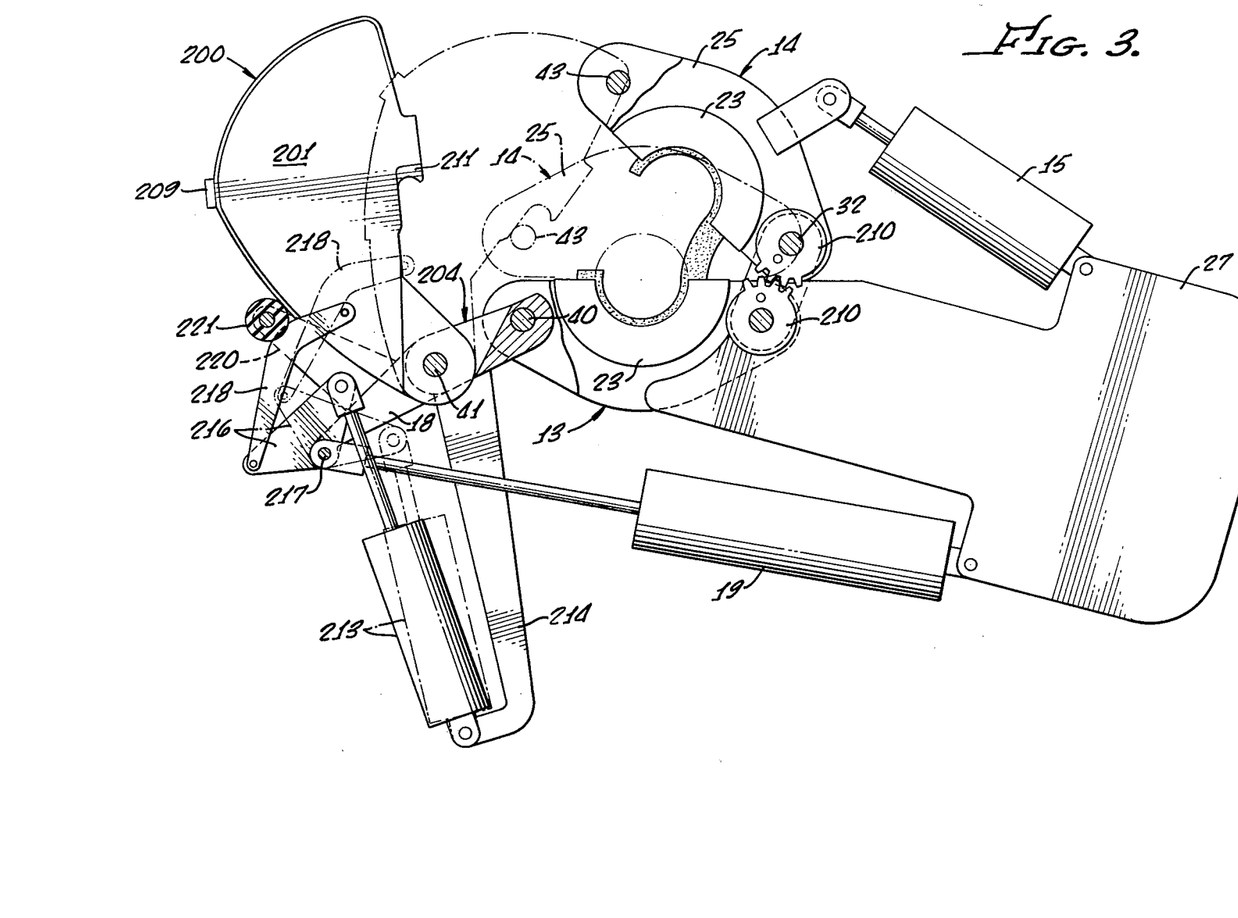
FIG. 3 is a top plan view of the present apparatus, showing it in closed condition.

Proceeding next to a description of additional cylinder means, the cylinders 15 open and close jaw 14 substantially the same as in the "Prior Art" embodiment of FIG. 1, except that the amount of opening of jaw 14 may be somewhat greater than in FIG. 1 in order to provide additional access room for the pipe and collar elements 10, 11 and 12 to be tested. Gears 210 (FIGS. 3 and 4) are locked to the ribs on which they are disposed, and aid in effecting proper opening of the jaws.

A hook-actuating cylinder 213 is pivoted at its inner end to the free end of a bracket 214, the other end of such bracket 214 being welded to an intermediate one of the bifurcated links 204. The remaining portion of the cylinder (the word "cylinder" being employed to denote a combined cylinder and piston assembly) is pivoted to a bell crank lever 216 mounted on a vertical rod 217 or pin. Rod or pin 217 extends between the outer ends of the upper and lower operating cranks 18, and has connected thereto the power cylinders 19 as shown.

Bell crank lever 216 is also pivotally connected to a link 218 (FIGS. 3 and 4) which in turn is pivotally connected to one of the hooks 200. Thus, and since all of the hooks 200 are secured together by the bar 209, operation of cylinder 213 effects opening and closing of the hooks as desired.

The apparatus further comprises arms 220 integral with the operating cranks 18 and extending away from the body of the apparatus, that is to say away from plates 27. At the outer ends of arms 20 there is provided a vertical pin around which are mounted rubber rollers 221 which serve as bumpers for the hooks 200 when they open.

DESCRIPTION OF THE HIGH-PRESSURE PACKER

Figure 7:
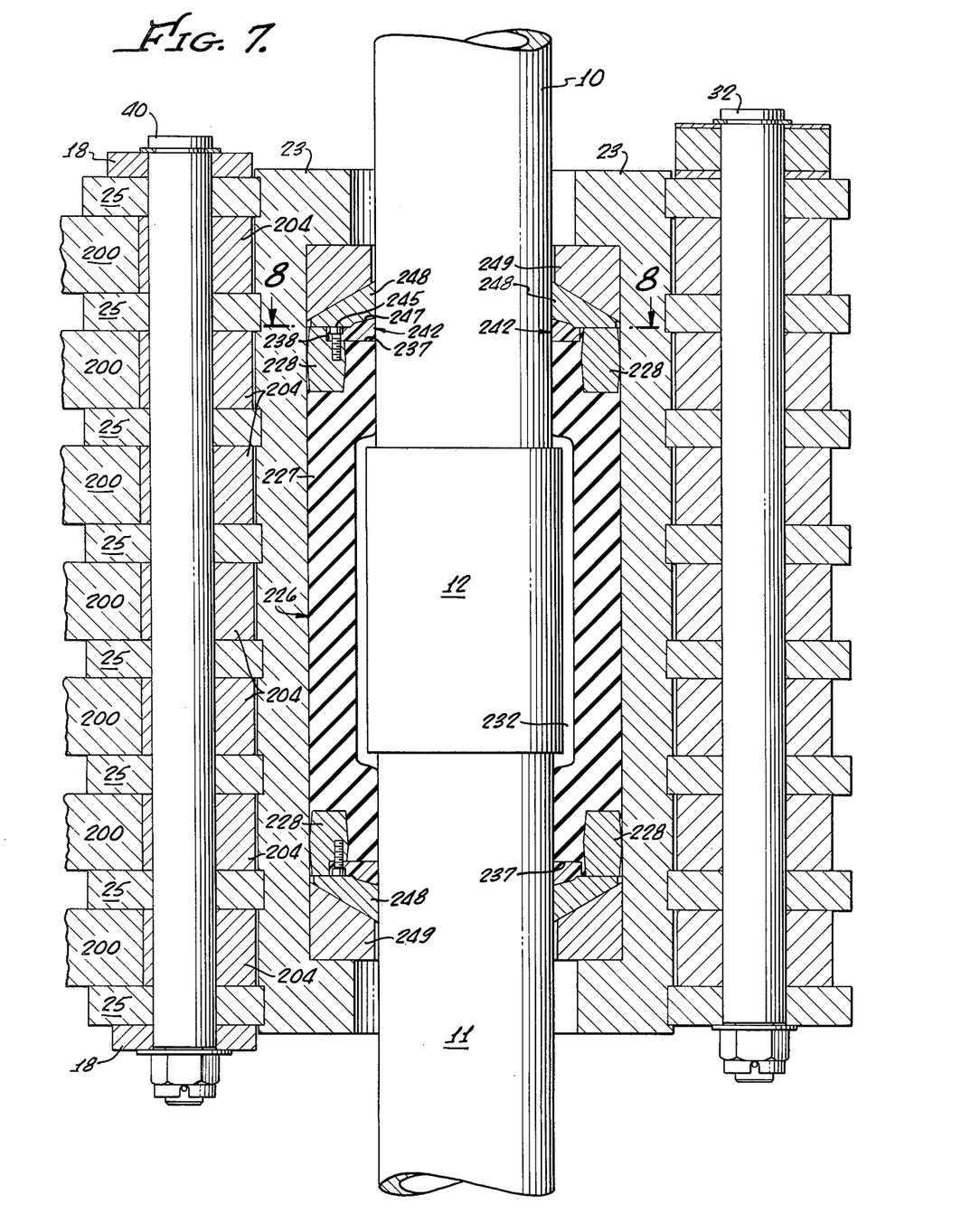
FIG. 7 is a vertical sectional view showing the apparatus in closed condition, the section being taken generally on line 7—7 of FIG. 3.

Referring to FIGS. 6 and 7, the packer is given the reference numeral 226. FIG. 6 may be compared to FIG. 9 of U.S. Pat. No. 3,371,521, whereas FIG. 7 may be compared to FIG. 3 of such patent.

The packer shown in FIGS. 6 and 7 comprises a molded rubber body 227 having various inserts molded therein and thus adhesively secured thereto. The inserts comprise, at the upper and lower ends of body 227, arcuate members (segments) 228 formed (preferably) of metal such as aluminum. The inserts further comprise extrusion-prevention bars 229 formed of metal (preferably steel) and which extend vertically for the full length of the packer. The bars 229 are diametrically opposite each other.

The rubber body 227 is split at plane 231, which split is adjacent one of the extrusion-prevention bars 229, in order that the packer may be opened and closed as the associated jaws open and close. The packer is secured to the jaws by means of vertical bars 230 (FIG. 6) which are molded into the rubber. Such bars are removably secured to the jaws. Suitable sealed inlet means 157 are provided to permit inlet and exhaust of water into the test chamber 232 which encloses the joint between elements 10, 11 and 12 (FIG. 7). It is into this test chamber that the water is introduced at very high pressure, following which any leakage is detected by lowering of pressure as shown on the gauge 103 (FIG. 1).

When the packer and the casing are in closed condition, each extrusion-prevention bar 229 is radially adjacent one of the cracks or gaps in the casing. Thus, rubber from body 227 is prevented from extruding outwardly through the cracks or gaps in response to the great pressure present in the test chamber 232.

The arcuate members 228 are spaced apart at their ends to form gaps therebetween, as shown in FIGS. 6 and 8. In two of such gaps there are the ends of extrusion-prevention bars 229, and also rubber. In the remaining two of such gaps there is only rubber.

It is emphasized that the arcuate members 228 (and the rubber and metal adjacent such arcuate members 228) extend above the upper end of the inner portion of packer body 227. Such upper end of the inner portion of the packer body is a horizontal (radial) surface and has the reference numeral 237. At two places, on opposite sides of gap 231, the arcuate members 228 are recessed to form recessed portions 238 and 239.

The recesses 238 and 239 receive ears 241 (FIG. 6) which are molded integrally on an extrusion-prevention or backup ring 242 which constitutes a highly important element of the present invention. Extrusion-prevention ring 242 is formed of a material substantially harder than that which forms the rubber body 227, but which is still able to open with such body 227 when the casing sections or jaws open.

Ring 242 is split at only one point, namely at 243 (FIG. 6), the split being inclined (lying in a plane inclined from the horizontal) as illustrated. Because of the thus-inclined split, there are provided plane faces which remain in contact even after slippage occurs as a result of stretching of the casing under pressure. Such split is between the ears 241.

Ring 242 seats on the radial surface 237 and also seats radially adjacent rubber which is molded adjacent the upwardly-protuberant edges and ends of members 228. At its inner cylindrical edge or wall, ring 242 closely abuts and conforms to the pipe section 10 as shown at the upper portion of FIG. 7. (The lower portion of FIG. 7 corresponds exactly to the upper portion thereof except it is the mirror image, being inverted as illustrated).

Ring 242 is secured to members 228 by screws 245 (FIG. 7) which extend through holes 246 in the ears 241 (FIG. 6). The screws are threaded into the members 228.

The upper-inner portion of ring 242 is upwardly convergent (at the upper portion of the packer, the lower portion being the mirror image as stated), there being a frustoconical surface 247 (FIG. 7). Surface 247 mates with a corresponding frustoconical surface on the lower side of ring segments 248. Ring segments 248, in turn, have upwardly inclined surfaces (forming a frustum of a cone when the segments are positioned as shown in FIG. 6) which seat below the conical surfaces of a metal backup ring 249. Such backup ring seats against a shoulder of the casing as shown in FIG. 7, and is thus prevented from moving upwardly. Segments 248 and elements 249 are held loosely in position by suitable screws which extend into oversize openings (the screws and openings being unshown), which permit the necessary small amount of movement in accordance with principles similar to those described in U.S. Pat. No. 3,371,521 relative to FIG. 4 thereof.

The synthetic resin extrusion-prevention ring 242 is preferably formed of polyurethane. It has a hardness substantially greater than does the rubber body 227 of the packer. The polyurethane is sufficiently soft, however, to permit the wide opening which occurs when the apparatus is in the position of FIGS. 2 and 4. As a specific example, the packer body 227 is formed of natural rubber having a Shore hardness (A scale) of 70. The polyurethane ring 242, on the other hand, has a Shore hardness (A scale) of about 80 to 90.

When the apparatus opens, the extrusion-prevention ring 242 does not remain at all regions in contact with the adjacent rubber, but instead "floats" except where it is secured to the elements 228 by screws 245. Then, when the apparatus closes, the ring 242 is disposed in the corner groove defined by surfaces 237, etc. The sizes of the packer and other elements are such that there is pre-loading of the packer rubber 227 around the pipes 10 and 11 when the apparatus closes, and there is also pre-loading at the opposed faces of the rubber at split 231. Then, when the very high fluid pressure is created in chamber 232 due to high-pressure pumping of water therein, there is further energizing and loading of the elements 227, 242, and so forth. The seals created are sufficiently positive, and the amount of extrusion so small, that the leakage from chamber 232 can only occur through the joints between tubular elements 10, 11 and 12. Thus, the reading of gauge 103 will represent a leak into the interior of elements 10-12 when such reading of element 103 drops significantly. It is then known that the joint is bad and should be reformed or discarded.

The relatively hard backup ring 242 has a much lesser tendency to extrude than does the rubber (preferably natural rubber) forming the body of the packer, which greatly increases the sealing action and minimizes the extrusion at the upper and lower ends of the packer. This, with an element that can be fully opened to receive the tubular pipe sections 10-12, represents a very significant advance in the leak-tester art.

OPERATION

Figure 4:
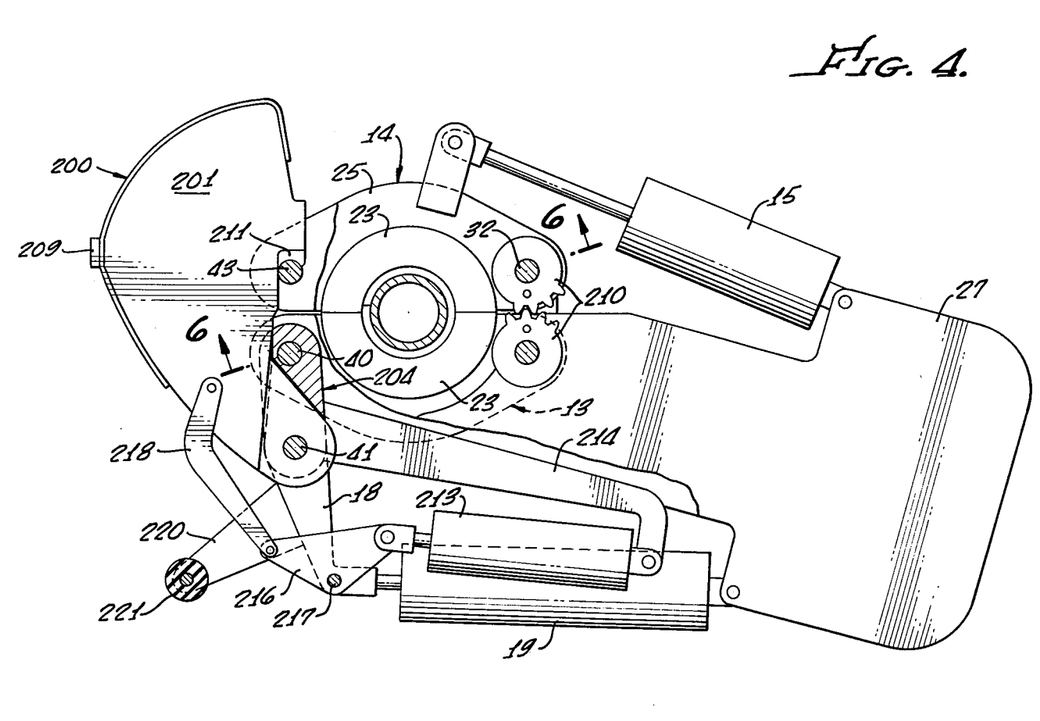
FIG. 4 corresponds to FIG. 3 but illustrates the apparatus in two open positions.

To summarize briefly the operation of the apparatus, let it be assumed that it is fully open as shown in FIGS. 2 and 4. The apparatus is then moved laterally until the pipe string 10-12 is positioned therein. Cylinders 15 are then extended to close jaw 14, following which cylinder 213 is shortened to effect clockwise movement of bell crank 216. This actuates link 218 to pivot hooks 200 clockwise from the position shown in phantom in FIG. 4 to the position shown in solid lines therein. Hook portions 211 of the hooks are then adjacent pin 43 but are not yet in locking relationship thereto. Such locking occurs when the power cylinders 19 are shortened to pivot operating cranks 18 counterclockwise about pin 40, so that hooks 200 shift from the FIG. 4 positions to the FIG. 3 positions. The apparatus is then fully locked and the packer and associated elements pre-loaded.

The test is then made by injecting fluid under high pressure, and noting whether or not the pressure indicated by gauge 103 decreases. Thereafter, the apparatus is opened by reversing the described sequence of operations. When the hooks 200 open, the force is absorbed by the rubber rollers 221 on arms 220.

The foregoing detailed description is to be clearly understood as given by way of illustration and example only, the spirit and scope of this invention being limited solely by the appended claims.

We claim:

1. High-pressure leak-testing apparatus for pipe joints, which comprises:
    (a) first and second "casing section" means to define a very strong casing around a pipe joint, said first and second means being adapted to open for lateral reception of a pipe joint and then to close around said pipe joint,
    (b) means to lock said first and second means in closed condition,
        said lock means comprising a plurality of bifurcated links pivotally connected to said first casing means,
        said lock means further comprising a plurality of hooks having end portions pivotally connected to said bifurcated links,
        said hooks being pivotally connected to said bifurcated links at relatively thin portions of said hooks and which fit between spaced portions of said bifurcated links,
        said lock means further comprising means on said second casing section to have said hooks hook therearound,
    (c) power means to operate said hooks,
    (d) sealing means to define a sealed chamber within the casing formed by said first and second casing sections, and
    (e) means to inject fluid into said sealed chamber and to detect whether or not there is a pressure drop therein.

2. The invention as claimed in claim 1, in which each of said first and second casing sections has several horizontal ribs mounted externally thereon in vertically spaced relationship for strengthening of said casing sections, in which unbifurcated end portions of said bifurcated links fit pivotally between said ribs on said first casing section, and in which said hooks fit between said ribs on said second casing section.

3. The invention as claimed in claim 1, in which said links and hooks are so positioned, when said casing sections are locked closed, that pressure in the tool operates to further close the links instead of opening the same.

4. A high-pressure leak-testing apparatus for pipe joints, which comprises:
   (a) first and second means to define first and second casing sections,
      said first and second sections each having several external ribs mounted therein to strengthen the same against bending,
         said ribs being provided in spaced parallel relationship in planes generally transverse to the axis of the casing,
   (b) link means pivotally connected to said first casing section,
   (c) several hooks pivotally connected to said link means and adapted to hook onto said second casing section to maintain said casing sections in closed condition,
   (d) power means to operate said hooks,
   (e) sealing means to define a sealed chamber within the casing formed by said first and second casing sections, and
   (f) means to inject fluid into said sealed chamber and to detect whether or not there is a pressure drop therein,
      characterized in that the number of said hooks is at least equal to the number of spaces between the ribs of said casing sections.

5. A packer assembly for a high-pressure leak-testing apparatus, said packer assembly comprising:
   (a) a hollow cylindrical mass of rubber which is split at at least one point about the circumference thereof,
      said mass of rubber having insert elements molded therein, and
   (b) extrusion-prevention means at each end of said mass of rubber and adapted to seat closely adjacent the pipe to be tested,
      said extrusion-prevention means being synthetic resin adapted to flex and having a resistance to extrusion much greater than that of said rubber forming said cylinder, said extrusion-prevention means being split.

6. The invention as claimed in claim 5, in which said extrusion-prevention means is formed of polyurethane and is split at only one point about the circumference thereof.

7. The invention as claimed in claim 6, in which the split is in an inclined plane so that partial opening of the extrusion-prevention means does not stop the extrusion-prevention operation.

8. The invention as claimed in claim 5, in which said rubber body is formed of natural rubber and has only one split therein, and in which said extrusion-prevention means is polyurethane, the Shore hardness of said rubber body being approximately 70 on the A scale and that of the extrusion-prevention means having a Shore hardness of about 80 to 90 on the A scale.

9. The invention as claimed in claim 5, in wich said packer body is split at only one point about the circumference thereof, in which said extrusion-prevention means is split at only one point about the circumference thereof, and in which the end portions of said extrusion-prevention means are connected to inserts in said packer body, the remaining portions of said extrusion-prevention means being adapted to float freely when the packer opens.

10. A high-pressure leak-testing apparatus for pipe joints, which comprises:
    (a) first and second means to define first and second casing sections,
       said first and second means each having several external ribs mounted therein to strengthen the same against bending,
          said ribs being provided in spaced parallel relationship in planes generally transverse to the axis of said casing,
    (b) link means connected pivotally to said first casing section,
    (c) several hooks connected to said link means and adapted to hook onto said second casing section to maintain said casing sections in closed condition,
       the number of said hooks being substantially equal to the number of spaces between the ribs of said casing sections,
    (d) a hollow cylindrical mass of rubber which is split at at least one point about the circumference thereof,
       said mass of rubber having insert elements molded therein, and
    (e) extrusion-prevention means at each end of said mass of rubber and adapted to seat closely adjacent the pipe to be tested,
       said extrusion-prevention means being synthetic resin adapted to flex and having a resistance to extrusion much greater than that of said rubber forming said cylinder.

11. High-pressure leak-testing apparatus for pipe joints, which comprises:
    (a) first and second "casing section" means to define a very strong casing around a pipe joint,
       said first and second means being adapted to open for lateral reception of a pipe joint and then to close around said pipe joint,
    (b) means to lock said first and second means in closed condition,
       said lock means comprising a plurality of bifurcated links,
       said lock means further comprising a plurality of hooks having end portions pivotally connected to said bifurcated links,
          said hooks being pivotally connected to said bifurcated links at relatively thin portions which nest together,
       said lock means further comprising means on said second casing section to have said hooks hook therearound,
    (c) power means to operate said hooks,
    (d) sealing means to define a sealed chamber within the casing formed by said first and second casing sections, and
    (e) means to inject fluid into said sealed chamber and to detect whether or not there is a pressure drop therein.

12. A packer assembly for a high-pressure leak-testing apparatus, said packer assembly comprising:
    (a) a hollow cylindrical mass of rubber which is split at at least one point about the circumference thereof,
       said mass of rubber having insert elements molded therein, and
    (b) extrusion-prevention means at each end of said mass of rubber and adapted to seat closely adjacent the pipe to be tested, said extrusion-prevention means being synthetic resin adapted to flex and having a resistance to extrusion greater than that of said rubber forming said cylinder, said extrusion-prevention means being split at only one point about the circumference thereof.

13. The invention as claimed in claim 12, in which the split is in an inclined plane so that partial opening of the extrusion-prevention means does not stop the extrusion-prevention operation.

* * * * *